(12) United States Patent
Burns et al.

(10) Patent No.: US 7,436,626 B2
(45) Date of Patent: Oct. 14, 2008

(54) CLAMP ASSEMBLY FOR A DATA STORAGE DEVICE WITH A LUBRICANT TRAP TO PREVENT LUBRICANT MIGRATION FROM MOUNTING SCREWS

(75) Inventors: John Martin Burns, Morgan Hill, CA (US); Andre Sirilutporn Chan, Milpitas, CA (US); Lynn Liebschutz, Morgan Hill, CA (US); Jr-Yi Shen, Sunnyvale, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 711 days.

(21) Appl. No.: 10/976,629

(22) Filed: Oct. 29, 2004

(65) Prior Publication Data

US 2006/0092559 A1    May 4, 2006

(51) Int. Cl.
*G11B 17/028* (2006.01)
(52) U.S. Cl. .................................. 360/99.12
(58) Field of Classification Search .............. 360/99.12, 360/99.08, 99.05, 97.01, 88, 86, 81, 137
See application file for complete search history.

(56) References Cited

U.S. PATENT DOCUMENTS

| | | | | |
|---|---|---|---|---|
| 5,550,687 A | | 8/1996 | Suzuki | 360/98.08 |
| 5,600,512 A | * | 2/1997 | Radwam et al. | 360/98.08 |
| 5,627,699 A | | 5/1997 | Ota et al. | 360/97.02 |
| 5,839,833 A | * | 11/1998 | Zang | 384/107 |
| 6,255,750 B1 | | 7/2001 | Mohajerani et al. | 310/51 |
| 6,417,988 B1 | | 7/2002 | Renken et al. | 360/99.12 |
| 6,563,668 B1 | * | 5/2003 | Suwito | 360/98.08 |
| 6,603,636 B2 | | 8/2003 | Schwandt et al. | 360/99.12 |
| 6,724,568 B1 | * | 4/2004 | Suwito et al. | 360/99.12 |
| 2002/0071205 A1 | | 6/2002 | Koyanagi et al. | 360/98.08 |
| 2003/0112553 A1 | | 6/2003 | Choo et al. | 360/99.12 |
| 2003/0218830 A1 | | 11/2003 | Khanna et al. | 360/98.08 |

FOREIGN PATENT DOCUMENTS

| | | |
|---|---|---|
| JP | 4146585 A1 | 5/1992 |
| JP | 9259497 A1 | 10/1997 |
| JP | 2001-332013 A1 | 11/2001 |

OTHER PUBLICATIONS

IBM, "Load Distributing Disk Clamp", IBM Tech. Discl. Bulletin, Jun. 1986, 86A 61724.

* cited by examiner

*Primary Examiner*—Julie Anne Watko
(74) *Attorney, Agent, or Firm*—G. Marlin Knight

(57) ABSTRACT

An embodiment of the invention clamp assembly for a disk which includes a cavity for trapping the excess lubricant which migrates from the load bearing threads of the screws that hold the assembly in place. In a preferred embodiment a flexible structure, called a screw lubricant trap, is included between a clamp and hub. A recess for the screw lubricant trap is formed in one or both of the mating surfaces of the clamp and/or the hub. The screws are arranged in the interior of the screw lubricant trap, so that when the hub is spinning, the excess lubricant is forced into the cavity to keep the excess lubricant from migrating onto the disk. The screw lubricant trap is preferably made to be non-load bearing to avoid affecting the load on the screw. Alternatively, a groove can be machined in the clamp to serve as the lubricant trap.

6 Claims, 3 Drawing Sheets

CLAMP ASSEMBLY FOR A DATA STORAGE DEVICE WITH A LUBRICANT TRAP TO PREVENT LUBRICANT MIGRATION FROM MOUNTING SCREWS

FIELD OF THE INVENTION

The invention relates to designs of data storage devices having spinning media such as hard disk drives which use screws to fasten components and more particularly to designs for lubricant repositories associated with screws.

BACKGROUND OF THE INVENTION

Various data storage system include a disk mounted a hub attached to a spindle motor which rotates the disk assembly. The following description will refer specifically to hard disk storage systems also called hard disk drives (HDD), but the principles are applicable to other devices. In a hard disk storage system the disk is typically rotated at thousands of rpms. FIG. 1 is an isometric illustration of a prior art clamp 51 with screw holes 66 and a central bore 68 which is used in a disk drive to clamp a disk on a hub. The clamp 51 mates with a hub 53 which is shown in FIG. 2 in a section view. The hub has threaded holes (not shown) for screws which are inserted through the holes shown in the clamp 51. The screw holes in the hub and clamp arranged in generally circular pattern around a central axis of rotation. The disks (not shown) have a central hole to fit on the hub and are held on the hub by the clamp with threaded screws which engage the threaded holes in the hub. These screws as well as others in the drive fasten different parts by delivering load in axial direction, which is very sensitive to screw surface finish. In order to deliver consistent axial load, the screws are either coated with a lubricating metal such as nickel (Ni) or have a liquid lubricant applied to them. Liquid lubricant tends to deliver more consistent axial load. When tightening the Ni-plated screws, undesirable particles can be generated which will cause contamination problems. Lubricated screws with proper solvent generate less particles. However, lubricated screws create a problem since the liquid lubricant can be mobile and tend to migrate across the spinning disk. Lubricant migration is obviously not desirable and could cause head-disk interface problems.

U.S. Pat. No. 6,417,988 to Renken, et al. describes a clamp for a disk. The disk assembly includes an annular disk clamp having a central aperture having a middle annular raised portion, an outer annular periphery portion, and at least one inner centering portion including an inner vertical peripheral surface. The central aperture of the disc clamp is sized to receive the spindle to allow the inner centering portion to center the disc clamp about the spindle, while the outer periphery engages the top surface of the information storage disc, and the middle annular raised portion extends above the top surface of the hub portion and is adapted to receive a downwardly directed force. A disk clamp retainer applying this force is connected to the spindle. The disk clamp retainer is fastened to the spindle and engages the middle annular raised portion of the disk clamp to transmit this force through the outer peripheral portion to the disk.

In U.S. Pat. No. 6,724,568 to Suwito, et al., a clamp for securing data storage disks to a hub of a disk drive mechanism is described which includes a flat body with a protuberance that defines a flat distal surface for engaging a data storage disk. The body also includes bores that receive members for securing the clamp to the hub and at least one groove for distributing the securing force of the securing members.

SUMMARY OF THE INVENTION

An embodiment of the invention clamp assembly for a rotatable disk, such as is used in disk data storage system, which includes a cavity for trapping the excess lubricant which migrates from the load bearing threads of the screws that hold the assembly in place. In a preferred embodiment a flexible structure, which will be called a screw lubricant trap, is included between a clamp and hub. A lubricant cavity formed in the screw lubricant trap. The screw lubricant trap is preferably located between the clamp and the hub in a recess in the clamp and forms a seal for the lubricant. The screw lubricant trap can be generally annular or shaped like a washer with an annular groove on the interior radial surface which faces the screws. Preferably the screw lubricant trap is made of a suitable flexible material. The cavity acts as a reservoir for the potentially mobile screw lubricant. A recess for the screw lubricant trap is formed in one or both of the mating surfaces of the clamp and/or the hub. The screws are arranged in the interior of the screw lubricant trap, so that when the hub is spinning, the excess lubricant is forced out into the cavity to kept the excess lubricant from migrating. The screw lubricant trap is preferably made to be non-load bearing to avoid affecting the load on the screw. Alternatively, a groove can be machined in the clamp to serve as the lubricant trap.

DETAILED DESCRIPTION OF THE INVENTION AND THE PREFERRED EMBODIMENTS

Figure 1:
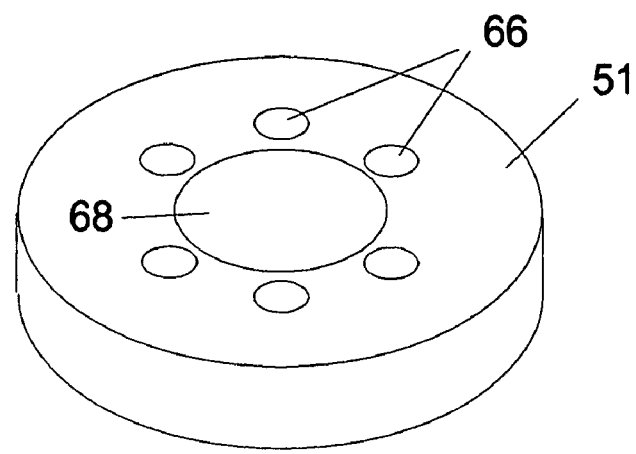
FIG. 1 is an isometric illustration of a prior art clamp.
Figure 2:
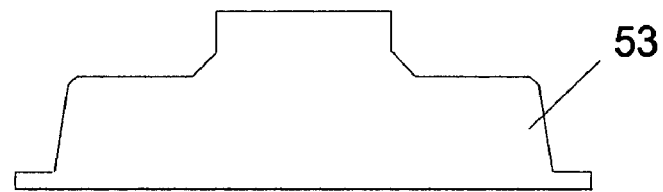
FIG. 2 is a section view of a prior art hub.
Figure 3:
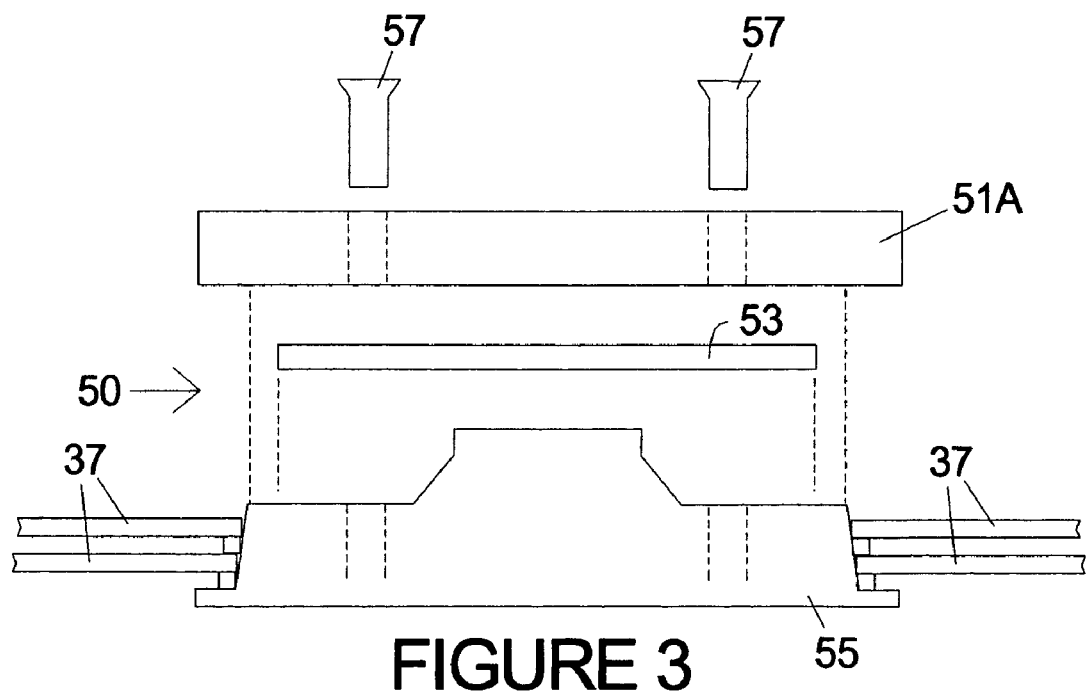
FIG. 3 is an exploded view of a clamp, screw lubricant trap and hub according to the invention.
Figure 7:
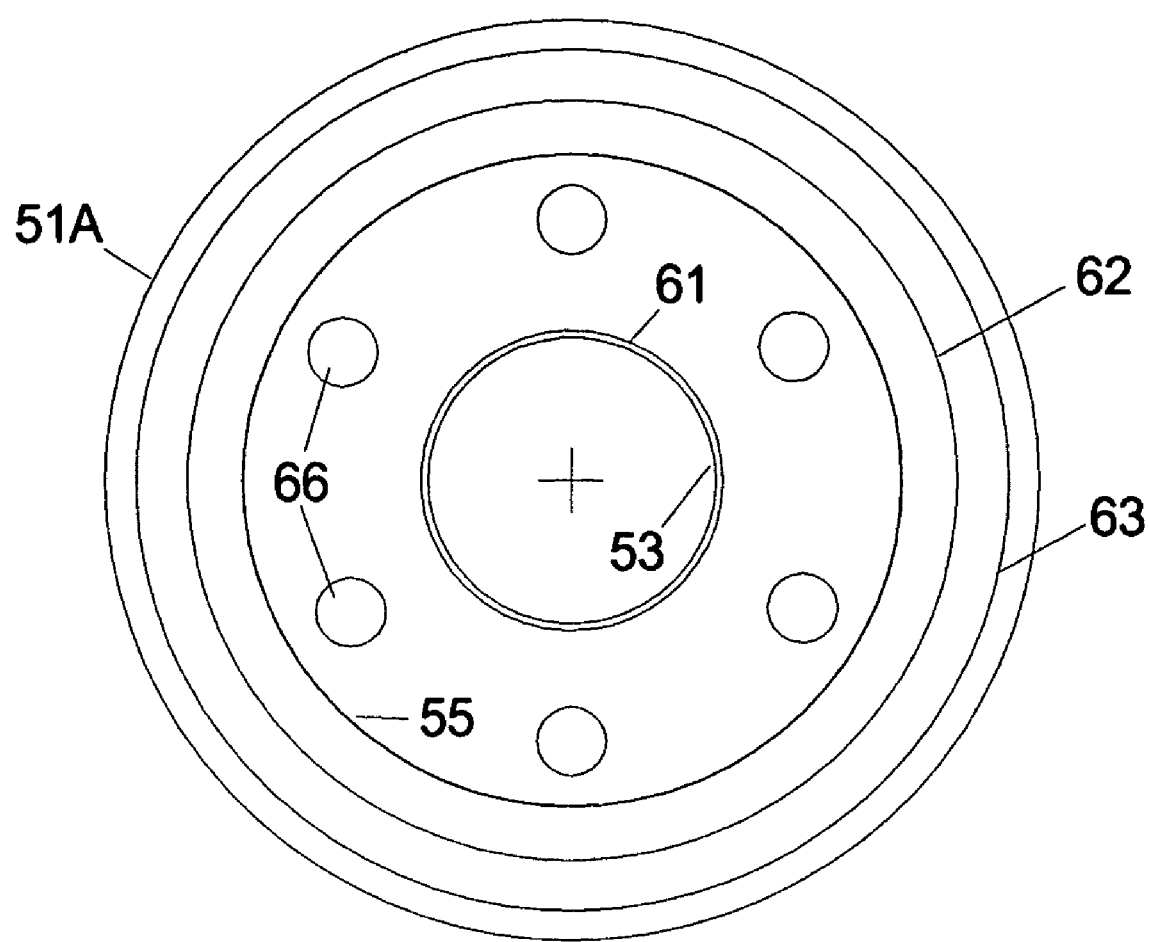
FIG. 7 illustrates the locations in a plan view of a clamp and screw lubricant trap according to the invention.

FIG. 3 is an exploded view of an assembly 50 according to the invention. Two disks 37 are shown separated by spacers, but any number of disk can be used. Only two screws 57 are shown, but any number of screws can be used. The locations for two of the screws are shown in dotted lines. The clamp 51A differs from the prior art in that it has an area where the screw lubricant trap 55 will fit between the clamp 51A and the hub 53. The screw lubricant trap 55 has a generally annular shape in a plan view with a diameter that is larger than the diameter of circular pattern for the screws and, therefore, is disposed around the set of screw shafts in the assembly as shown in FIG. 7. Even though multiple disks can be present, only one screw lubricant trap 55 is needed.

Figure 4A:
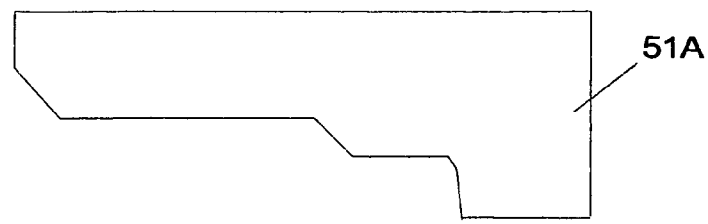
FIG. 4 is a section view of one side of a clamp according to the invention.

FIG. 4 is a section view of a clamp 51A according to the invention. FIG. 7 illustrates the relative locations of the screw lubricant trap 55 in relation to the other components. The clamp 51A is generally annular in shape with a diameter that is larger than the diameter of the screw lubricant trap 55. The clamp 51A has holes for mounting screws corresponding to the threaded holes in the hub and has a recess for receiving the screw lubricant trap to dispose the screw lubricant trap 55 between the hub and the clamp on the surface around the threaded holes, so that excess lubricant on the threads of the screws will tend to migrate when the assembly is rotating into the cavity on the interior surface of the screw lubricant trap.

Figure 5:
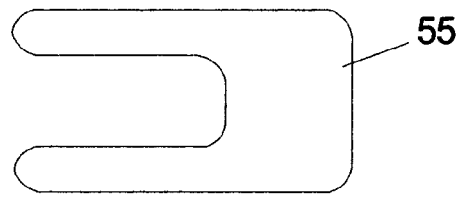
FIG. 5 is a section view of a screw lubricant trap according to the invention.

FIG. 5 is a section view of a screw lubricant trap 55 according to the invention. It is preferably made of a compressible material such as rubber or plastic. The preferred general shape of the screw lubricant trap 55 in a plan view is that of a ring or washer. The diameter of the screw lubricant trap 55 is less than that of the clamp 51A, so that screw lubricant trap 55 can fit into an annular recess in the underside of clamp 51A. The section profile of the screw lubricant trap is preferably generally u-shaped with the cavity on the interior surface. The shape of the screw lubricant trap is not critical, so long as it provides a seal between the clamp and the hub and has a topography which will tend to trap the lubricant. Therefore, the section profile of the screw lubricant trap can be rectangular, elliptical, etc.

Figure 6:
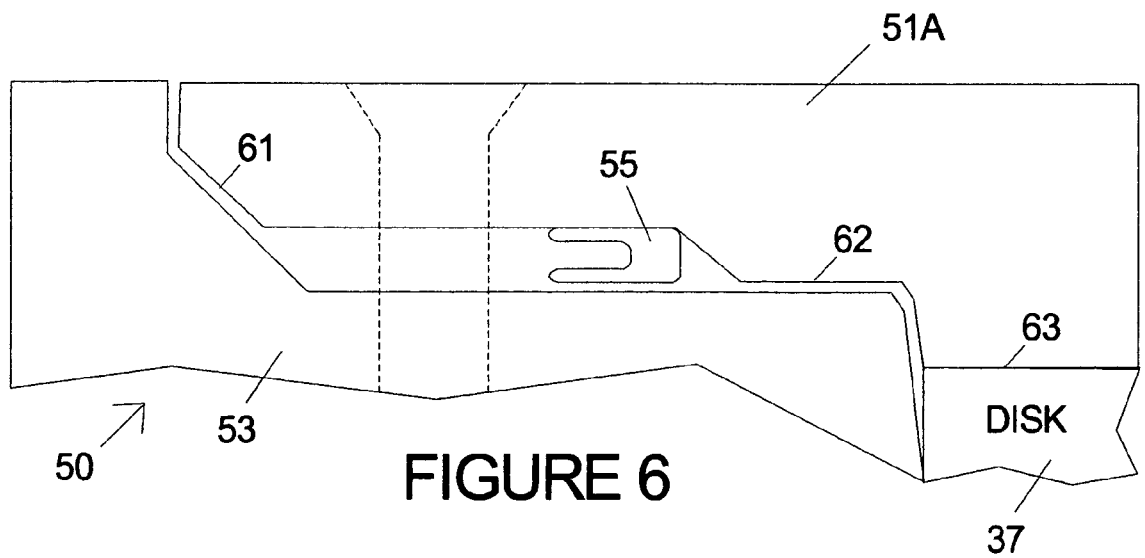
FIG. 6 is a section view of a clamp, screw lubricant trap and hub showing the matings according to the invention.

FIG. 6 shows a section view of assembly 50 to illustrate the mating of the parts. The clamp 51A is designed so that none of its surfaces such as 61, 62 are in contact with the hub. Only contacting surface 63 is in contact with disk 37. The location for one of the screws is shown in dotted lines. In a plan view as illustrated is in FIG. 7 with lines drawn for the surfaces, the surfaces 61, 62, 63 are annular and are centered on the axis of rotation. Surface 61 has a smaller diameter and is located inside the generally circular pattern of the screw holes 66.

The screw lubricant trap 55 is preferably non-load bearing. The screw lubricant trap should form a sufficient seal between the clamp and the hub to prevent the lubricant from migrating past the screw lubricant trap onto the disk. One advantage of making the screw lubricant trap 55 non-load bearing is that it is then isolated from the load bearing design factors. If it were made to be in contact with the hub then the effect on the load would potentially vary with temperature and the design parameters would be more difficult to calculate and control. If the screw lubricant trap is non-load bearing it is not essential that it be made of a flexible material. It is preferred that flexible material be used for the ease of manufacturing and to provide a large dimensional tolerance.

The preferred lubricant for use with the invention has a viscosity high enough that is not mobile under the force of gravity at the application level required. A common lubricant used in the disk drives is a commercially available lubricant known as P104 which meets this criterion. When the assembly is spinning in a disk drive at thousands of rpms, the forces are much greater than gravity and any mobile lubricant on the threads of the screws will tend to migrate in the u-shape trap. When the assembly is not spinning gravity will be insufficient to cause the lubricant to move out of the trap. The deeper the u-shape, the more the lubricant will tend to be trapped.

Figure 4B:
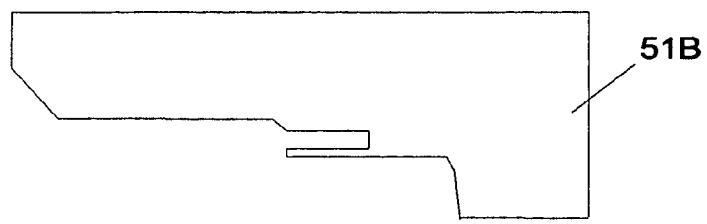

The metal disk clamp could be machined to include the cavities for the lubricant, as is illustrated in FIG. 4B which show clamp 51B with an annular grove machined in the place where the separate screw lubricant trap would be located. This is not the preferred embodiment, however. It is easier and more cost effective to form the screw lubricant traps as separate members than to machine of the metal disk clamp.

One alternative embodiment includes a shallow groove machined into the hub for the screw lubricant trap to sit in. In this alternative, referring to FIG. 6, the area of the hub 53 which contacts the screw lubricant trap 55 is slightly recessed.

The invention has been described with respect to particular embodiments, but other uses and applications for the screw lubricant trap according to the invention will be apparent to those skilled in the art.

The invention claimed is:

1. An assembly for use in mounting a rotating member comprising:
   a hub for the rotating member with a surface having threaded holes for receiving screws arranged in generally circular pattern around a central axis of rotation, the circular pattern having a first diameter;
   a screw lubricant trap having a generally annular shape in a plan view with a second diameter that is larger than the first diameter, the screw lubricant trap having a u-shaped cavity on an interior surface; and
   a generally annular clamp with a third diameter that is larger than the second diameter, having holes for mounting screws corresponding to the threaded holes in the hub and having a recess for receiving the screw lubricant trap, with the screw lubricant trap disposed between the hub and the clamp on the surface around the threaded holes forming an excess lubricant seal with the u-shaped cavity facing the holes for mounting screws.

2. The assembly of claim 1 wherein the screw lubricant trap is made of a compressible material and exerts no appreciable pressure on the clamp or the hub.

3. An assembly for use in mounting a rotating disk comprising:
   a hub for the rotating disk with a surface having threaded holes for receiving screws arranged in generally circular pattern around a central axis of rotation, the circular pattern having a first diameter; and
   a generally annular clamp with a second diameter that is larger than the first diameter, having holes for mounting screws corresponding to the threaded holes in the hub and having a groove on an interior annular surface containing excess screw lubricant, the groove being disposed in a generally circular arrangement centered on the central axis of rotation and being disposed around the holes for the screws on the underside of the clamp facing the hub, so that excess lubricant on the threads of the screws will tend to migrate into the groove on the interior surface of the clamp when the assembly is rotating.

4. A disk data storage device comprising:
   a rotatable disk;
   a hub for the rotatable disk with a surface having threaded holes for receiving screws arranged in generally circular pattern around a central axis of rotation, the circular pattern having a first diameter;
   a screw lubricant trap having a generally annular shape in a plan view with a second diameter that is larger than the first diameter, the screw lubricant trap having a cavity on an interior surface, the cavity containing screw lubricant; and
   a generally annular clamp with a third diameter that is larger than the second diameter, having holes for mounting screws corresponding to the threaded holes in the hub and having a recess for receiving the screw lubricant trap, with the screw lubricant trap disposed between the hub and the clamp forming an excess lubricant seal on the surface around the threaded holes when the assembly is rotating.

5. The disk data storage system of claim 4 wherein the screw lubricant trap is made of a compressible material and exerts no appreciable pressure on the clamp or the hub.

6. A disk data storage system comprising:
   a rotatable disk;
   a hub for the rotatable disk with a surface having threaded holes for receiving screws arranged in generally circular pattern around a central axis of rotation, the circular pattern having a first diameter; and a generally annular clamp with a second diameter that is larger than the first diameter, having holes for mounting screws corresponding to the threaded holes in the hub and having a groove on an interior annular surface containing excess screw lubricant the groove being disposed in a generally circular arrangement centered on the central axis of rotation and being disposed around the holes for the screws on the underside of the clamp facing the hub, so that excess lubricant on the threads of the screws migrates into the groove on the interior surface of the clamp when the disk is rotating.

* * * * *